(12) United States Patent
Tagawa

(10) Patent No.: US 6,452,144 B1
(45) Date of Patent: Sep. 17, 2002

(54) TILT DETECTION METHOD AND TILT DETECTOR

(75) Inventor: Yukihiro Tagawa, Yokohama (JP)

(73) Assignee: Samsung Electro-Mechanics Co., Ltd., Kyunggi-do (KR)

(*) Notice: Subject to any disclaimer, the term of this patent is extended or adjusted under 35 U.S.C. 154(b) by 0 days.

(21) Appl. No.: 09/821,743

(22) Filed: Mar. 30, 2001

(30) Foreign Application Priority Data

Sep. 1, 2000 (JP) ......................................... 2000-266254

(51) Int. Cl.[7] .......................... G02B 27/40; G11B 7/00; G11B 11/03; G11B 11/105; G11B 15/62

(52) U.S. Cl. .................. 250/201.5; 369/44.32; 369/53.19

(58) Field of Search ..................... 250/201.5; 369/44.32, 369/53.19, 53.12, 44.41

(56) References Cited

U.S. PATENT DOCUMENTS 6,351,438 B1 * 2/2002 Kahlman .................. 369/44.32

* cited by examiner

Primary Examiner—Ricky Mack
Assistant Examiner—Alicia M Harrington
(74) Attorney, Agent, or Firm—Morgan, Lewis & Bockius LLP

(57) ABSTRACT

A tilt detection method and tilt detector which can make the size of an optical pickup small, improve an installation efficiency of the pickup and reduce a manufacturing cost of the pickup. A first light receiver and second light receiver output detected results corresponding to the amounts of received light to a comparator, respectively. The comparator detects a difference between output signals from the first and second light receivers and outputs the detected result as a tangential tilt signal. An analog delay element delays an output signal from the comparator for a predetermined period of time corresponding to the rotation of an optical disc by 90° and outputs the delayed result as a radial tilt signal.

4 Claims, 6 Drawing Sheets

TILT DETECTION METHOD AND TILT DETECTOR

BACKGROUND OF THE INVENTION

1. Field of the Invention

The present invention relates in general to an optical disc apparatus, and more particularly to a tilt detection method and tilt detector which can detect a tilt angle of an optical axis of a beam of light projected on a recording medium.

2. Description of the Prior Art

In an optical disc apparatus, a beam of laser light emitted from a light source must be projected perpendicularly to a recording surface of an optical disc to accurately record or reproduce information thereon or therefrom. However, in the case where the recording surface of the optical disc is bent or distorted, it is tilted relative to an optical axis of the beam of laser light emitted from the light source. Namely, the beam of laser light emitted from the light source is projected on the recording surface of the optical disc under the condition that it is tilted relative to the recording surface. Provided that the recording surface of the optical disc is tilted, the beam of laser light will travel on the recording surface of the disc at a distance varying with a position, resulting in a complexity in the shape of a beam splitter and an inaccurate reading of information to be reproduced.

A description will hereinafter be given of conventional tilt detectors capable of overcoming the above problem, with reference to the accompanying drawings. FIG. 7 is a view schematically showing the construction of a conventional radial tilt detector for detecting a radial tilt amount, or a tilt amount in a radial direction of an optical disc 1. In FIG. 7a, a photodetector 3 is shown to include light receivers 31 and 32 for outputting detected results corresponding to the amounts of received light, respectively. Because the optical disc 1 is kept deformed due to a bending or distortion, a recording surface of the disc 1 is tilted relative to an optical axis of a beam of light emitted from a light source if the disc 1 is fixed to a spindle 2 in a tilted state, which is an output shaft of a spindle motor 4. For a tilt rising at the center of the optical disc 1 in a radial direction of the disc 1 and falling at the outer edge of the disc 1 in the radial direction as shown in FIG. 7a, a beam of light arriving at a light receiving surface of the photodetector 3 has a deformed elliptical shape as indicated by the reference numeral 35 in FIG. 7b.

For a tilt falling at the center of the optical disc 1 in the radial direction of the disc 1 and rising at the outer edge of the disc 1 in the radial direction as shown in FIG. 7c, a beam of light arriving at the light receiving surface of the photodetector 3 has a deformed elliptical shape as indicated by the reference numeral 36 in FIG. 7d. If a beam of light is projected and reflected on the recording surface of the optical disc 1 under the condition that the disc 1 is tilted as above stated, a beam of light arriving at the light receiving surface of the photodetector 3 has a deformed elliptical shape having a coma-aberration, not a precise to circular shape.

In the conventional radial tilt detector, as shown in FIGS. 7a and 7b, a beam of light for detection of a tilt amount is emitted from a light source 30 to the optical disc 1 separately from a beam of light for information reproduction. The beam of light emitted to the optical disc 1 is reflected therefrom and received by the light receivers 31 and 32, into which the photodetector 3 is divided in two perpendicularly to the radial direction of the disc 1. A radial tilt amount of the optical disc, or a tilt amount in the radial direction of the optical disc, relative to an optical axis of the light beam emitted from the light source 30 is detected from a difference between detection signals from the light receivers 31 and 32.

FIG. 8 is a view schematically showing the construction of a conventional tangential tilt detector for detecting a tangential tilt amount, or a tilt amount in a tangential direction of the optical disc 1. In FIG. 8a, a photodetector is shown to include light receivers 51 and 52 for outputting detected results corresponding to the amounts of received light, respectively. For a tilt rising at the front portion of the optical disc 1 in a tangential direction of the disc 1 and falling at the rear of the disc 1 in the tangential direction as shown in FIG. 8a, a beam of light arriving at a light receiving surface of the photodetector 5 has a deformed elliptical shape as indicated by the reference numeral 55 in FIG. 8b. For a tilt falling at the front portion of the optical disc 1 in the tangential direction of the disc 1 and rising at the rear portion of the disc 1 in the tangential direction as shown in FIG. 8c, a beam of light arriving at the light receiving surface of the photodetector 5 has a deformed elliptical shape as indicated by the reference numeral 56 in FIG. 8d.

In the conventional tangential tilt detector, as shown in FIGS. 8a and 8b, a beam of light for detection of a tilt amount is emitted from a light source 50 to the optical disc 1 separately from a beam of light for information reproduction. The beam of light emitted to the optical disc 1 is reflected therefrom and received by the light receivers 51 and 52, into which the photodetector 5 is divided in two perpendicularly to the tangential direction of the disc 1. A tangential tilt amount of the optical disc, or a tilt amount in the tangential direction of the optical disc, relative to an optical axis of the light beam emitted from the light source 50 is detected from a difference between detection signals from the light receivers 51 and 52 (the light emitting unit emitting the beam of light for detection of the tilt amount and the two light receivers will collectively be referred to hereinafter as a tilt sensor).

In the above-mentioned method, however, an optical pickup must comprise two tilt sensors, a tangential tilt sensor for detecting a tangential tilt amount and a radial tilt sensor for detecting a radial tilt amount, in addition to a photodetector for receiving a beam of light reflected from a recording medium and outputting an information reproducing signal in response to an optical signal of the received light beam. For this reason, the optical pickup is increased in size and cost and inconvenient to install.

SUMMARY OF THE INVENTION

Therefore, the present invention has been made in view of the above problems, and it is an object of the present invention to provide a tilt detection method and tilt detector which can make the size of an optical pickup small, improve an installation efficiency of the pickup and reduce a manufacturing cost of the pickup.

In accordance with one aspect of the present invention, the above and other objects can be accomplished by the provision of a tilt detection method for a tilt detector for projecting a beam of laser light from a light source on a recording medium of a disc shape and detecting a tilt of an optical axis of the projected beam of light relative to the recording medium, the method comprising the step of detecting a tilt in a tangential direction of the recording medium, delaying the detected result for a predetermined period of time corresponding to the rotation of the medium by 90° or 217° and outputting the delayed result as a tilt in a radial direction of the medium.

In accordance with another aspect of the present invention, there is provided a tilt detection method for a tilt detector for projecting a beam of laser light from a light source on a recording medium of a disc shape and detecting a tilt of an optical axis of the projected beam of light relative to the recording medium, the method comprising the step of detecting a tilt in a radial direction of the recording medium, delaying the detected result for a predetermined period of time corresponding to the rotation of the medium by 90° or 270° and outputting the delayed result as a tilt in a tangential direction of the medium.

In accordance with a further aspect of the present invention, there is provided a tilt detector for projecting a beam of laser light from a light source on a recording medium of a disc shape and detecting a radial tilt of an optical axis of the projected beam of light relative to the recording medium, comprising delay means for delaying the detected result of the radial tilt for a predetermined period of time corresponding to the rotation of the recording medium by 90° or 270° and outputting the delayed result as a tilt in a tangential direction of the recording medium.

In accordance with yet another aspect of the present invention, there is provided a tilt detector for projecting a beam of laser light from a light source on a recording medium of a disc shape and detecting a tangential tilt of an optical axis of the projected beam of light relative to the recording medium, comprising delay means for delaying the detected result of the tangential tilt for a predetermined period of time corresponding to the rotation of the recording medium by 900 or 270° and outputting the delayed result as a tilt in a radial direction of the recording medium.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 1:
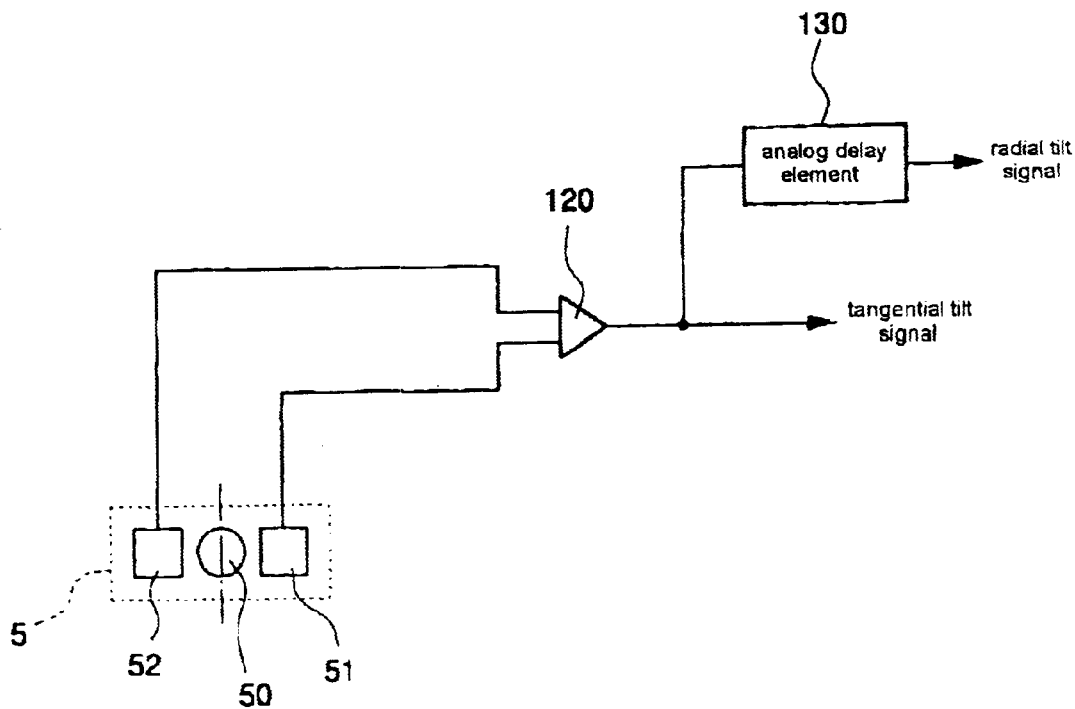
FIG. 1 is a block diagram schematically showing the construction of a tilt detector in accordance with a first embodiment of the present invention.

With reference to FIG. 1, there is schematically shown in block form the construction of a tilt detector in accordance with a first embodiment of the present invention. In this embodiment, the tilt detector employs a conventional photodetector 5 as shown in FIG. 8. The photodetector 5 includes light receivers 51 and 52 for outputting detected results corresponding to the amounts of received light, respectively. A light source 50 emits a beam of light for detection of a tilt amount to an optical disc separately from a beam of light for information reproduction. The beam of light emitted to the optical disc is reflected therefrom and received by the light receivers 51 and 52, into which the photodetector 5 is divided in two perpendicularly to a tangential direction of the disc.

The light receivers 51 and 52 output detected results corresponding to the amounts of received light to a comparator 120.

The comparator 120 detects a difference between output signals from the light receivers 51 and 52 and outputs the detected result as a signal indicative of a tilt amount (tangential tilt amount) in the tangential direction of the optical disc.

An analog delay element 130 delays an output signal from the comparator 120 for a predetermined period of time and outputs the delayed result as a signal indicative of a tilt amount (radial tilt amount) in a radial direction of the optical disc. The predetermined period of time preferably corresponds to a period of time that the optical disc rotates by 90°.

The function of the analog delay element 130 will hereinafter be described in more detail. Because the optical disc is kept deformed due to a bending or distortion, a recording surface of the disc is tilted relative to an optical axis of the beam of light emitted from the light source if the disc is fixed to a spindle in a tilted state, which is an output shaft of a spindle motor. This tilt amount varies periodically with rotation of the disc. A tilt component of one cycle is present for one rotation of the disc. As a result, a radial tilt component is generated by delaying a tangential tilt component for a predetermined period of time corresponding to the rotation of the optical disc by 90°. In this manner, the analog delay element 130 generates the radial tilt component by delaying the tangential tilt component for the predetermined period of time corresponding to the rotation of the optical disc by 90°.

A description will hereinafter given of the operation of the tilt detector with the above-stated construction of FIG. 1.

First, the light source 50 emits a beam of light, which is then projected on a recording surface of the optical disc and reflected therefrom. Then, the beam of light reflected from the recording surface of the optical disc is received by the photodetector 5. The light receiver 51 in the photodetector 5 outputs a detected result corresponding to the amount of received light to the comparator 120.

The light receiver 52 in the photodetector 5 also outputs a detected result corresponding to the amount of received light to the comparator 120.

The comparator 120 detects a difference between output signals from the light receivers 51 and 52 and outputs the detected result as a tangential tilt signal indicative of a tilt amount in the tangential direction of the optical disc. The analog delay element 130 delays an output signal from the comparator 120 for a predetermined period of time corresponding to a period of time that the optical disc rotates by 90°, and outputs the delayed result as a radial tilt signal indicative of a tilt amount in the radial direction of the optical disc.

Preferably, a tilt correction mechanism can be used to correct a tilt angle on the basis of the radial tilt signal and tangential tilt signal so as to apply the photodetector 5 with the correction of a tilt in the radial direction of the optical disc and the correction of a tilt in the tangential direction of the disc.

Figure 2:
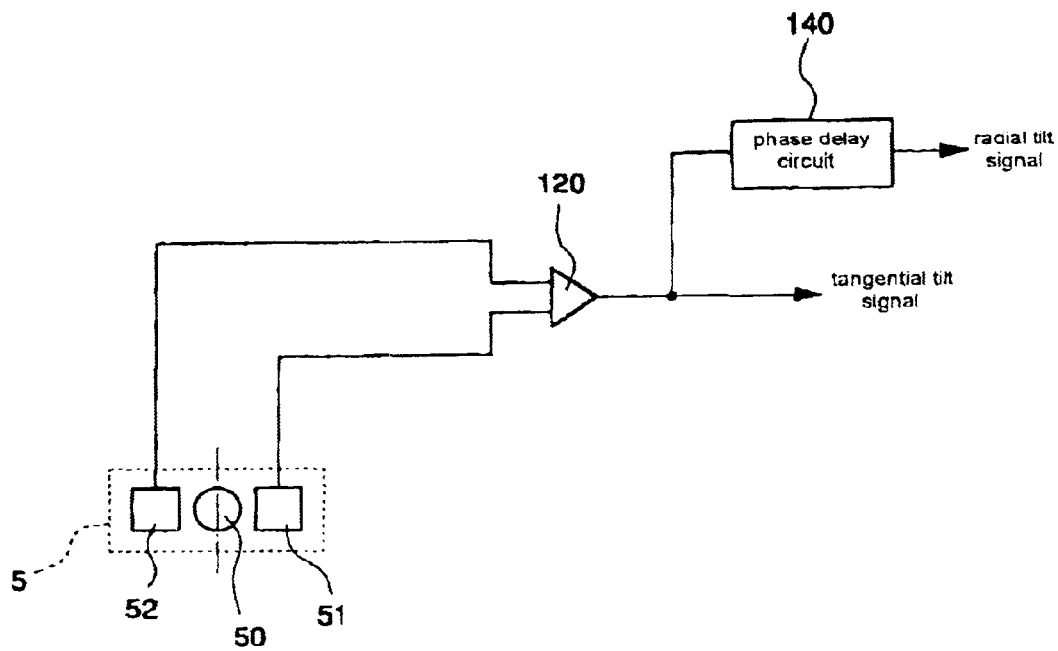
FIG. 2 is a block diagram schematically showing the application of a phase delay circuit to the construction of the tilt detector of FIG. 1.

In the present embodiment, the analog delay element 130 is employed to delay the tangential tilt signal. Alternatively, a phase delay circuit 140 may replace the analog delay element 130, as shown in FIG. 2, to delay the phase of the tangential tilt signal by 90° and output the delayed result as the radial tilt signal.

Figure 3:
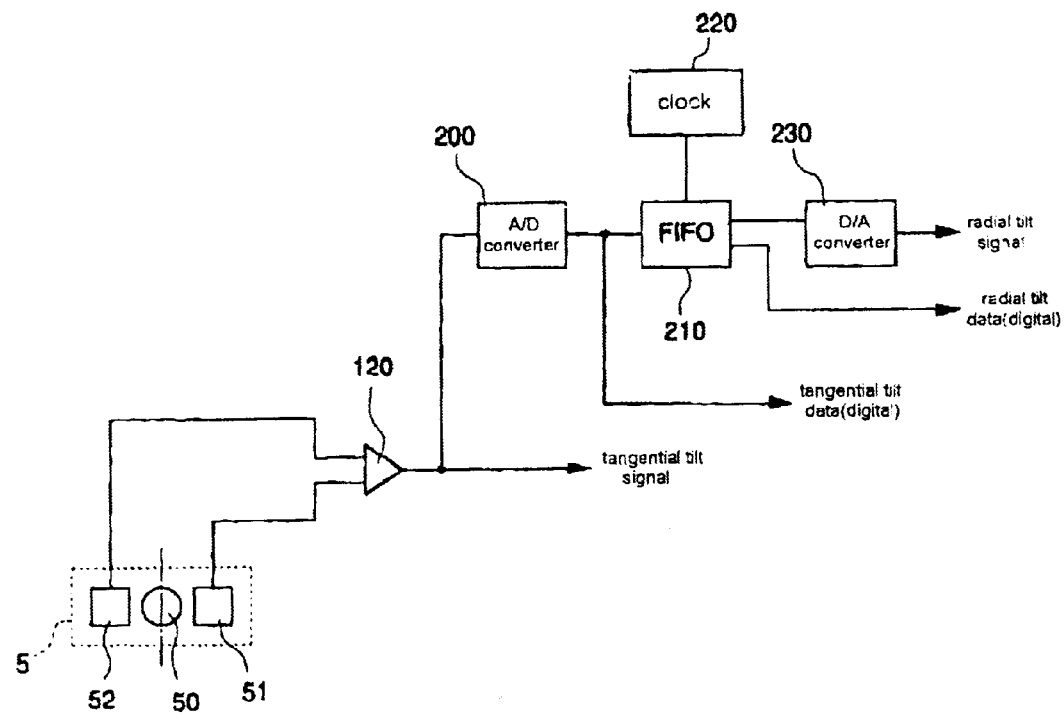
FIG. 3 is a block diagram schematically showing the construction of a tilt detector in accordance with a second embodiment of the present invention.

FIG. 3 is a block diagram schematically showing the construction of a tilt detector in accordance with a second embodiment of the present invention. Some parts in this second embodiment are the same as those in the first embodiment. Therefore, the same parts are denoted by the same reference numerals and a description thereof will thus be omitted. An analog/digital (A/D) converter 200 is adapted to convert an analog tangential tilt signal from the comparator 120 into a digital signal and output the converted digital signal as tangential tilt data to a first-in-first-out (FIFO) memory 210.

The FIFO memory 210 temporarily stores the digital tangential tilt data from the A/D converter 200 and outputs the stored tangential tilt data as radial tilt data to a digital/analog (D/A) converter 230 in response to a timing signal from a clock 220. The clock 220 outputs the timing signal to the FIFO memory 210 for the output of the tilt data. This timing signal corresponds to timing of the output signal from the comparator 120 at the moment that the optical disc has rotated by 90°. The D/A converter 230 converts the digital radial tilt data from the FIFO 210 into an analog signal and outputs the converted analog signal as a radial tilt signal.

A description will hereinafter given of the operation of the tilt detector with the above-stated construction of FIG. 3. First, the light source 50 emits a beam of light, which is then projected on a recording surface of the optical disc and reflected therefrom. Then, the beam of light reflected from the recording surface of the optical disc is received by the photodetector 5. The light receiver 51 in the photodetector 5 outputs a detected result corresponding to the amount of received light to the comparator 120.

The light receiver 52 in the photodetector 5 also outputs a detected result corresponding to the amount of received light to the comparator 120.

The comparator 120 detects a difference between output signals from the light receivers 51 and 52 and outputs the detected result as a tangential tilt signal indicative of a tilt amount in the tangential direction of the optical disc.

The A/D converter 200 converts an analog tangential tilt signal from the comparator 120 into a digital signal and outputs the converted digital signal as tangential tilt data to the FIFO memory 210. The FIFO memory 210 sequentially stores the digital tangential tilt data from the A/D converter 200.

On the other hand, the clock 220 outputs the timing signal to the FIFO 210 at the moment that the optical disc has rotated by 90°. The FIFO 210 outputs the stored tangential tilt data as radial tilt data to the D/A converter 230 upon receiving the timing signal from the clock 220. The D/A converter 230 converts the digital radial tilt data from the FIFO 210 into an analog signal and outputs the converted analog signal as a radial tilt signal.

Preferably, a tilt correction mechanism can be used to correct a tilt angle on the basis of the radial tilt signal and tangential tilt signal so as to apply the photodetector 5 with the correction of a tilt in the radial direction of the optical disc and the correction of a tilt in the tangential direction of the disc.

In the second embodiment, preferably, the tilt data from the FIFO memory 210 may be applied as radial tilt data to the tilt correction mechanism, which may then correct a radial tilt on the basis of the applied radial tilt data.

Further, the output data from the A/D converter 200 may be applied as tangential tilt data to the tilt correction mechanism, which may then correct a tangential tilt on the basis of the applied tangential tilt data.

Figure 4:
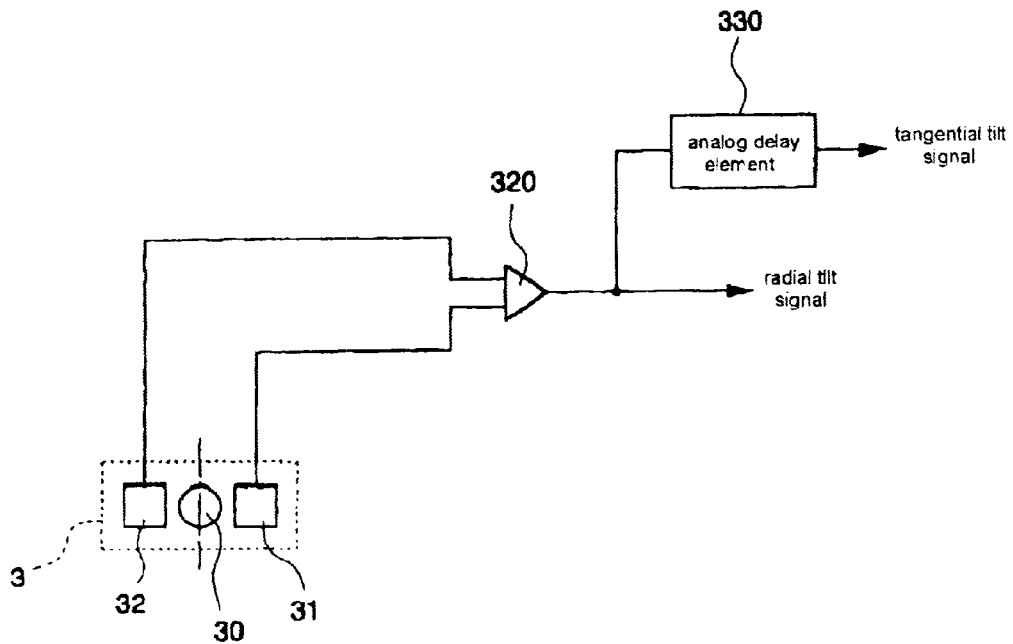
FIG. 4 is a block diagram schematically showing the construction of a tilt detector in accordance with a third embodiment of the present invention.

With reference to FIG. 4, there is schematically shown in block form the construction of a tilt detector in accordance with a third embodiment of the present invention. In this embodiment, the tilt detector employs a conventional photodetector 3 as shown in FIG. 7. The photodetector 3 includes light receivers 31 and 32 for outputting detected results corresponding to the amounts of received light, respectively. A light source 30 emits a beam of light for detection of a tilt amount to an optical disc separately from a beam of light for information reproduction. The beam of light emitted to the optical disc is reflected therefrom and received by the light receivers 31 and 32, into which the photodetector 3 is divided in two perpendicularly to a radial direction of the disc.

The light receivers 31 and 32 output detected results corresponding to the amounts of received light to a comparator 320.

The comparator 320 detects a difference between output signals from the light receivers 31 and 32 and outputs the detected result as a signal indicative of a tilt amount (radial tilt amount) in the radial direction of the optical disc.

An analog delay element 330 delays an output signal from the comparator 320 for a period of time that the optical disc rotates by 90° and outputs the delayed result as a signal indicative of a tilt amount (tangential tilt amount) in a tangential direction of the optical disc. The function of the analog delay element 330 will hereinafter be described in more detail. Because the optical disc is kept deformed due to a bending or distortion, a recording surface of the disc is tilted relative to an optical axis of the beam of light emitted from the light source if the disc is fixed to a spindle in a tilted state, which is an output shaft of a spindle motor. This tilt amount varies periodically with rotation of the disc. A tilt component of one cycle is present for one rotation of the disc. As a result, a tangential tilt component is generated by delaying a radial tilt component for a predetermined period of time corresponding to the rotation of the optical disc by 90°. In this manner, the analog delay element 330 generates the tangential tilt component by delaying the radial tilt component for the predetermined period of time corresponding to the rotation of the optical disc by 90°.

A description will hereinafter given of the operation of the tilt detector with the above-stated construction of FIG. 4.

First, the light source 30 emits a beam of light, which is then projected on a recording surface of the optical disc and reflected therefrom. Then, the beam of light reflected from the recording surface of the optical disc is received by the photodetector 3. The light receiver 31 in the photodetector 3 outputs a detected result corresponding to the amount of received light to the comparator 320.

The light receiver 32 in the photodetector 3 also outputs a detected result corresponding to the amount of received light to the comparator 320.

The comparator 320 detects a difference between output signals from the light receivers 31 and 32 and outputs the detected result as a radial tilt signal indicative of a radial tilt amount. The analog delay element 330 delays an output signal from the comparator 320 for a predetermined period of time corresponding to a period of time that the optical disc rotates by 90°, and outputs the delayed result as a tangential tilt signal indicative of a tangential tilt amount.

Preferably, a tilt correction mechanism can be used to correct a tilt angle on the basis of the radial tilt signal and radial tilt signal so as to apply the photodetector 3 with the correction of a tilt in the radial direction of the optical disc and the correction of a tilt in the radial direction of the disc.

Figure 5:
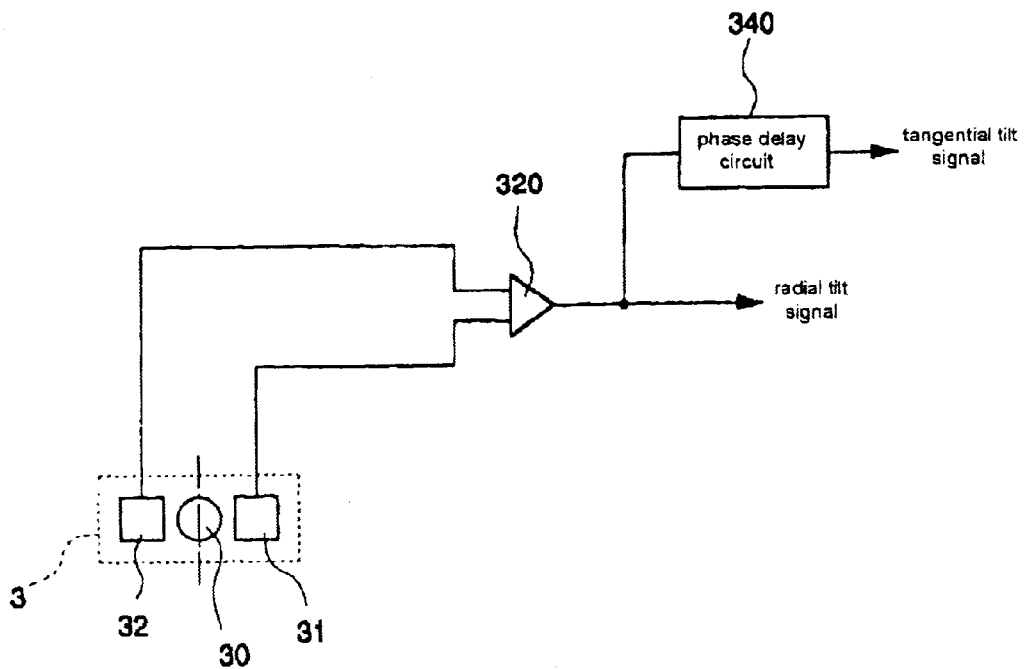
FIG. 5 is a block diagram schematically showing the application of a phase delay circuit to the construction of the tilt detector of FIG. 4.

In the present embodiment, the analog delay element 330 is employed to delay the radial tilt signal. Alternatively, a phase delay circuit 340 may replace the analog delay element 330, as shown in FIG. 5, to delay the phase of the radial tilt signal by 90° and output the delayed result as the tangential tilt signal.

Figure 6:
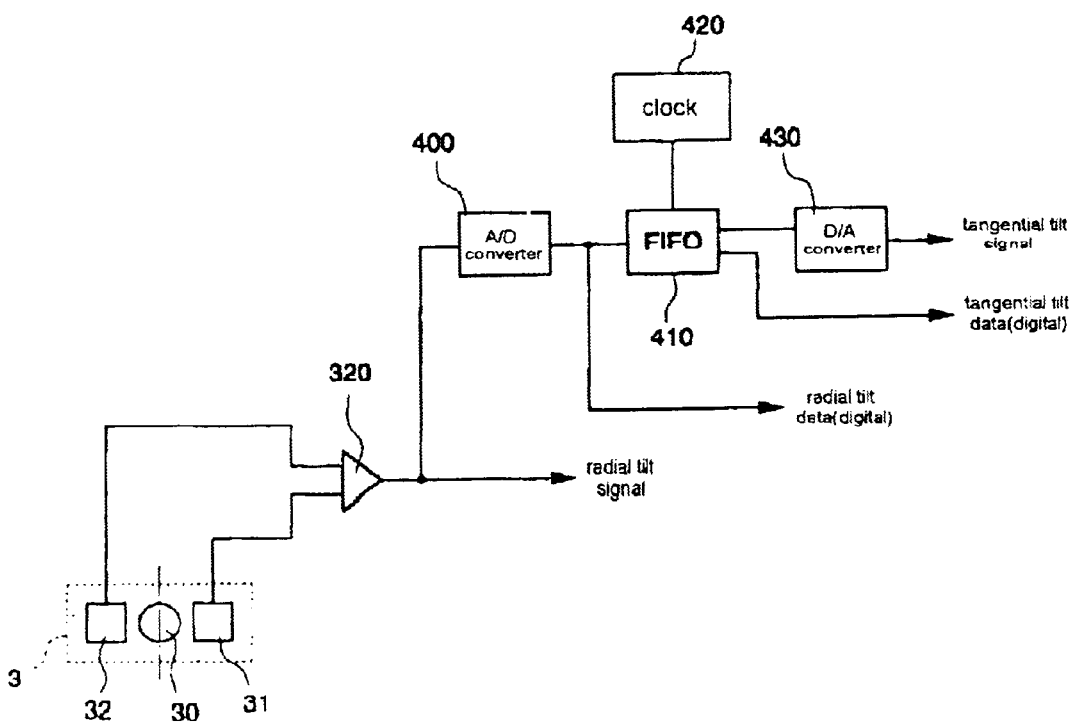
FIG. 6 is a block diagram schematically showing the construction of a tilt detector in accordance with a fourth embodiment of the present invention.
Figure 7A:
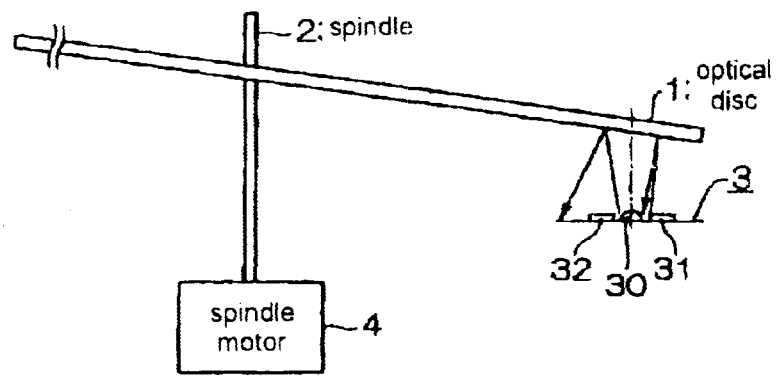
FIGS. 7a to 7d are views schematically showing the construction of a conventional radial tilt detector.
Figure 7B:
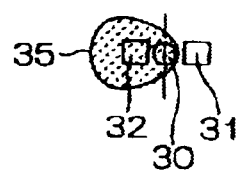
Figure 7C:
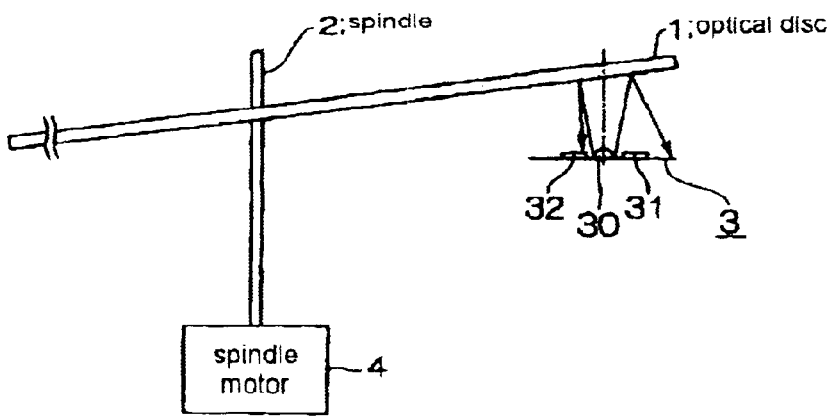
Figure 7D:
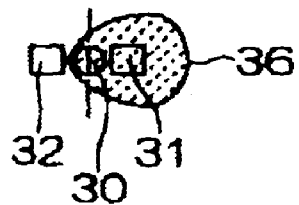
Figure 8A:
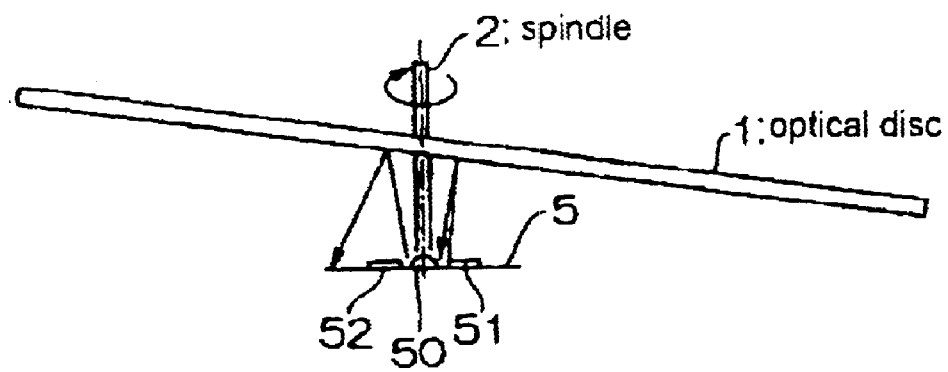
FIGS. 8a to 8d are views schematically showing the construction of a conventional tangential tilt detector.
Figure 8B:
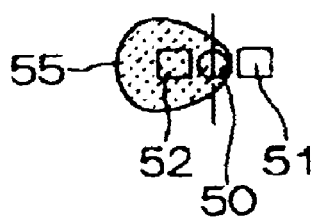
Figure 8C:
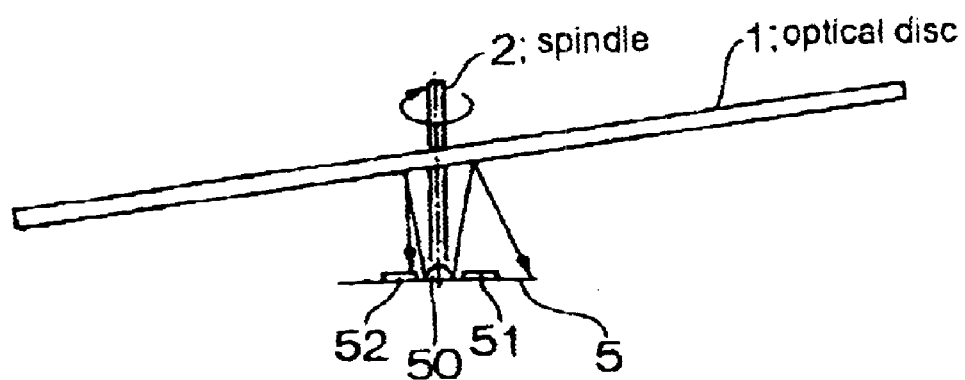
Figure 8D:
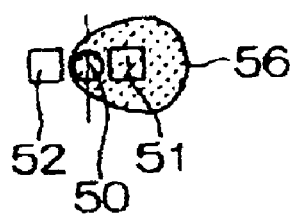

FIG. 6 is a block diagram schematically showing the construction of a tilt detector in accordance with a fourth embodiment of the present invention. Some parts in this fourth embodiment are the same as those in the third embodiment. Therefore, the same parts are denoted by the same reference numerals and a description thereof will thus be omitted. An analog/digital (A/D) converter 400 is adapted to convert an analog radial tilt signal from the comparator 320 into a digital signal and output the converted digital signal as radial tilt data to a first-in-first-out (FIFO) memory 410.

The FIFO memory 410 temporarily stores the digital radial tilt data from the A/D converter 400 and outputs the stored radial tilt data as tangential tilt data to a digital/analog (D/A) converter 430 in response to a timing signal from a clock 420. The clock 420 outputs the timing signal to the FIFO memory 410 for the output of the tilt data. This timing signal corresponds to timing of the output signal from the comparator 320 at the moment that the optical disc has rotated by 90°. The D/A converter 430 converts the digital tangential tilt data from the FIFO 410 into an analog signal and outputs the converted analog signal as a tangential tilt signal.

A description will hereinafter given of the operation of the tilt detector with the above-stated construction of FIG. 6. First, the light source 30 emits a beam of light, which is then projected on a recording surface of the optical disc and reflected therefrom. Then, the beam of light reflected from the recording surface of the optical disc is received by the photodetector 3. The light receiver 31 in the photodetector 3 outputs a detected result corresponding to the amount of received light to the comparator 320.

The light receiver 32 in the photodetector 3 also outputs a detected result corresponding to the amount of received light to the comparator 320.

The comparator 320 detects a difference between output signals from the light receivers 31 and 32 and outputs the detected result as a radial tilt signal indicative of a radial tilt amount.

The A/D converter 400 converts an analog radial tilt signal from the comparator 320 into a digital signal and outputs the converted digital signal as radial tilt data to the FIFO memory 410. The FIFO memory 410 sequentially stores the digital radial tilt data from the AID converter 400.

On the other hand, the clock 420 outputs the timing signal to the FIFO 410 at the moment that the optical disc has rotated by 90°. The FIFO 410 outputs the stored radial tilt data as tangential tilt data to the D/A converter 430 upon receiving the timing signal from the clock 420. The D/A converter 430 converts the digital tangential tilt data from the FIFO 410 into an analog signal and outputs the converted analog signal as a tangential tilt signal.

Preferably, a tilt correction mechanism can be used to correct a tilt angle on the basis of the radial tilt signal and tangential tilt signal so as to apply the photodetector 3 with the correction of a tilt in the radial direction of the optical disc and the correction of a tilt in the tangential direction of the disc.

In the fourth embodiment, preferably, the tilt data from the FIFO memory 410 may be applied as tangential tilt data to the tilt correction mechanism, which may then correct a tangential tilt on the basis of the applied tangential tilt data.

Further, the output data from the AID converter 400 may be applied as radial tilt data to the tilt correction mechanism, which may then correct a radial tilt on the basis of the applied radial tilt data.

In the above-described embodiments, the radial tilt signal is generated from the tangential tilt signal on the basis of the delay time corresponding to the time period that the optical disc rotates by 90°. Further, the tangential tilt signal is generated from the radial tilt signal on the basis of the delay time corresponding to the time period that the optical disc rotates by 90°. However, it should be noted that, in this invention, the delay time is not limited to the time period that the optical disc rotates by 90°. For example, the delay time may preferably be set to a period of time that the optical disc rotates by 270°. More preferably, the delay time may be set to a period of time that the optical disc rotates by 450°, 630°, . . . , corresponding to rotations of 90° or 270°.

According to the above-stated embodiments, the radial tilt signal is detected on the basis of the output of the photodetector and the tangential tilt signal is generated by delaying the radial tilt signal for a predetermined period of time corresponding to the rotation of the optical disc by 90° or 270°. Because the optical disc is kept deformed due to a bending or distortion, the recording surface of the disc is tilted relative to the optical axis of the beam of light emitted from the light source if the disc is fixed to a spindle in a tilted. state, which is an output shaft of a spindle motor. The present invention can correct such a tilt, make the size of the tilt detector small, improve an installation efficiency of the detector and reduce a manufacturing cost of the detector.

As apparent from the above description, according to the present invention, the tilt detector can generate a tilt amount of an optical axis of a light beam projected on a recording medium in a tangential direction of the medium by delaying the detected result of a tilt in a radial direction of the medium for a predetermined period of time corresponding to the rotation of the medium by 90° or 270°. Therefore, a separate tangential tilt detector need not be installed to detect the tilt in the tangential direction of the recording medium. Further, the present tilt detector can be reduced in size and convenient to install.

Also, according to this invention, the tilt detector can generate a tilt amount of an optical axis of a light beam projected on a recording medium in a radial direction of the medium by delaying the detected result of a tilt in a tangential direction of the medium for a predetermined period of time corresponding to the rotation of the medium by 90° or 270°. Therefore, a separate radial tilt detector need not be installed to detect the tilt in the radial direction of the recording medium. Further, the present tilt detector can be reduced in size and convenient to install.

Furthermore, according to this invention, there is no necessity for installing a plurality of tilt detectors, thereby curtailing the manufacturing cost.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A tilt detection method for a tilt detector for projecting a beam of laser light from a light source on a recording medium of a disc shape and detecting a tilt of an optical axis of the projected beam of light relative to the recording medium, said method comprising the step of detecting a tilt in a tangential direction of said recording medium, delaying the detected result for a predetermined period of time corresponding to the rotation of said medium by 90° or 270° and outputting the delayed result as a tilt in a radial direction of said medium.

2. A tilt detection method for a tilt detector for projecting a beam of laser light from a light source on a recording medium of a disc shape and detecting a tilt of an optical axis of the projected beam of light relative to the recording medium, said method comprising the step of detecting a tilt in a radial direction of said recording medium, delaying the detected result for a predetermined period of time corresponding to the rotation of said medium by 90° or 270° and outputting the delayed result as a tilt in a tangential direction of said medium.

3. A tilt detector for projecting a beam of laser light from a light source on a recording medium of a disc shape and detecting a radial tilt of an optical axis of the projected beam of light relative to the recording medium, comprising delay means for delaying the detected result of said radial tilt for a predetermined period of time corresponding to the rotation of said recording medium by 90° or 270° and outputting the delayed result as a tilt in a tangential direction of said recording medium.

4. A tilt detector for projecting a beam of laser light from a light source on a recording medium of a disc shape and detecting a tangential tilt of an optical axis of the projected beam of light relative to the recording medium, comprising delay means for delaying the detected result of said tangential tilt for a predetermined period of time corresponding to the rotation of said recording medium by 90° or 270° and outputting the delayed result as a tilt in a radial direction of said recording medium.

* * * * *